(12) United States Patent
French et al.

(10) Patent No.: US 6,624,918 B1
(45) Date of Patent: Sep. 23, 2003

(54) VOLTAGE CONTROL OF OPTICAL RECEIVER BANDWIDTH

(75) Inventors: John Sargent French, Hereford Township, Berks County, PA (US); William J. Thompson, Breinigsville, PA (US); Patrick Raymond Wiand, Reading, PA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 0 days.

(21) Appl. No.: 09/349,570

(22) Filed: Jul. 8, 1999

(51) Int. Cl.[7] .............................................. H04B 10/06
(52) U.S. Cl. ...................... 359/189; 330/308; 359/194
(58) Field of Search ................................ 359/152, 189, 359/194; 330/110, 308, 307; 250/214 A

(56) References Cited

U.S. PATENT DOCUMENTS

| | | | | |
|---|---|---|---|---|
| 4,529,947 A | * | 7/1985 | Biard et al. .................. 330/259 |
| 4,608,542 A | * | 8/1986 | Siegel .......................... 330/279 |
| 5,257,285 A | * | 10/1993 | Thorp .......................... 375/11 |
| 5,455,705 A | | 10/1995 | Gusinov | |
| 5,801,588 A | * | 9/1998 | Nishiyama ................... 330/308 |
| 5,821,814 A | * | 10/1998 | Katayama et al. ........... 330/277 |
| 5,907,422 A | | 5/1999 | Ho et al. | |
| 6,055,279 A | * | 4/2000 | Ota ............................. 375/319 |
| 6,175,275 B1 | * | 1/2001 | Barou et al. .................. 330/98 |

FOREIGN PATENT DOCUMENTS

EP  0 430 238 A2  11/1990

* cited by examiner

Primary Examiner—Brent A. Swarthout
(74) Attorney, Agent, or Firm—Wendy W. Koba

(57) ABSTRACT

An optical receiver is formed to include a digitally-controlled preamplifier that is used to adjust the bandwidth of the receiver. A measured bandwidth of the receiver is compared to a desired bandwidth and a digital control signal (such as a voltage, current, or any other appropriate parameter) supplied to the preamplifier is thereafter adjusted (either increased or decreased) to increase/decrease the bandwidth of the receiver to the desired value. A voltage regulator and potentiometer may be used as the digital controller and coupled to the input voltage supply of the preamplifier to provide the needed adjustment in voltage.

17 Claims, 2 Drawing Sheets

VOLTAGE CONTROL OF OPTICAL RECEIVER BANDWIDTH

TECHNICAL FIELD

The present invention relates to a digital control arrangement for adjusting the bandwidth of an optical receiver and, more particularly, to an arrangement for modifying a parametric value (e.g., voltage, current, capacitance, etc.) applied to a preamplifier so as to tune the output bandwidth of the receiver.

DESCRIPTION OF THE PRIOR ART

In certain optical communication systems, it has become important to control the bandwidth of the optical receiver. It is often desirable to maintain a bandwidth only as high as necessary to recover the information contained in the signal, thereby filtering out noise at higher frequencies. In particular, many optically amplified communication systems, especially wavelength division multiplexed (WDM) systems, have extremely tight tolerances on the receiver bandwidth in order to use the optical receiver to filter out amplified spontaneous emission noise.

Conventional optical receivers may exhibit a bandwidth that is too large for some WDM applications. One solution to this problem is to modify the fabrication process for optical receivers (usually GaAs integrated circuit devices) so as to produce receivers with the required tolerances. This approach is considered too costly for many applications. Alternatively, the fabricated devices may go through a series of tests to "weed out" those receivers (perhaps a majority of devices) with unfavorable characteristics (such as, for example, bandwidth too low (that is, the 3 dB cutoff frequency is below an acceptable value), or bandwidth too large (allowing, for example, an excessive amount of noise to be received). In this case, the device "yield" drops significantly, resulting in an increased cost for those devices that are found to be acceptable. Another prior art solution is to apply post-filtering beyond the receiver preamplifier so as to limit the noise from the preamplifier. Although this solution can be used successfully, it is considered to be extremely time-consuming, since it requires each receiver to be tested individually, with capacitors of the appropriate value being inserted in the circuit to provide the required filtering. The tight tolerance on the bandwidth requirement for optically amplified systems also leads to relatively low manufacturing yield as process variations move the receiver bandwidth beyond the design constraints.

A need remains in the art, therefore, for a relatively simple and straightforward arrangement for improving the control of the bandwidth of optical receivers.

SUMMARY OF THE INVENTION

The need remaining in the prior art is addressed by the present invention, which relates to a digital control arrangement for adjusting the bandwidth of an optical receiver and, more particularly, to an arrangement for modifying a parametric value (e.g., voltage, current, capacitance, etc.) applied to a preamplifier so as to tune the output bandwidth of the receiver.

In accordance with one embodiment of the present invention, a voltage regulator is used to apply the input supply voltage to the preamplifier of an optical receiver, where the preamplifier is known to display a bandwidth that is a function of the input voltage. The voltage regulator is adjustable by means of an included potentiometer. In operation, the bandwidth of the receiver is first determined. If the bandwidth is too low for the particular application, the potentiometer is adjusted to vary the resistance sensed by the voltage regulator, thus increasing (or decreasing, depending upon the polarity) the input voltage applied to the preamplifier. The change in input voltage results in increasing the bandwidth of the preamplifier, thus moving the 3 db cutoff of the receiver "upward" in frequency. Conversely, if the measured bandwidth of an exemplary receiver is too "high" (that is, the 3 dB cutoff frequency is beyond an upper bound limit, allowing for noise signals to pass through the receiver), the potentiometer is adjusted such that the voltage applied to the preamplifier by the voltage regulator is decreased (or increased, depending upon the polarity). The change in input voltage results in decreasing the bandwidth, moving the receiver's bandwidth "downward" into the "acceptable" range.

It is a feature of this arrangement of the present invention that the voltage applied as the preamplifier input voltage is regulated via the voltage regulator. In this arrangement, therefore, variations in "nominal" supply voltages from device to device will not affect the performance of the receiver.

In a preferred embodiment of the present invention, a digital potentiometer is used and controlled by a testing system such that the resistance is either incremented or decremented (as the case may be) in predetermined step sizes until a desired bandwidth is obtained.

In accordance with the present invention, any type of parametric control can be used to digitally change the preamplifier bandwidth. For example, a current signal, resistance, capacitance, electric and/or magnetic field, etc., can all be incremented/decremented in a predetermined manner to provide for an adjustment of the bandwidth of the preamplifier.

Other and further features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
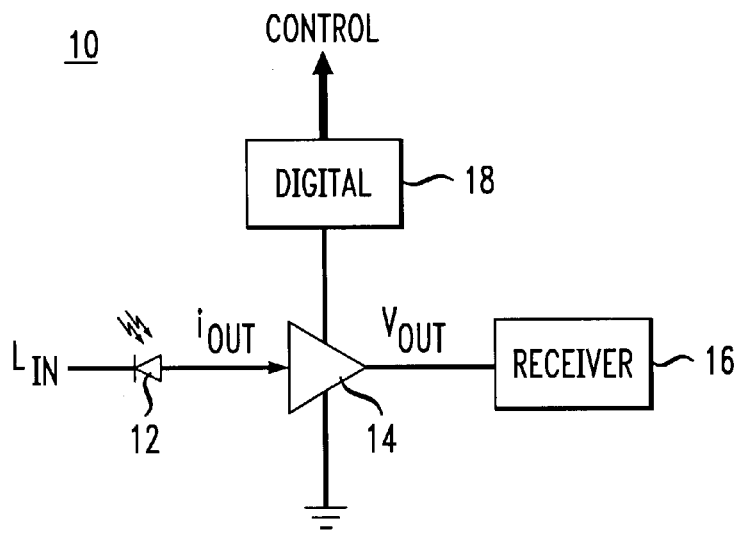
FIG. 1 illustrates a block diagram of an exemplary digitally-controlled optical receiver formed in accordance with the present invention.

An exemplary optical receiver 10 incorporating the digitally-controlled bandwidth adjustment arrangement of the present invention is illustrated in FIG. 1. It is to be understood that a complete optical receiver may comprise other components beyond those shown in the illustration where these other components are not considered to be germane to the subject matter of the present invention. In general, an optical receiver functions to recover an electrical output signal, denoted $V_{OUT}$ from a received optical signal, denoted $L_{IN}$. Referring to FIG. 1, received optical signal $L_{IN}$ is received by an optical device (photodetector) 12, such as a pin diode, which functions to convert the optical signal into an electrical current, defined as $i_{out}$. Since most photodetectors cannot generate an electrical output of a level acceptable for subsequent processing in electrical circuits, preamplifier 14 is first used to convert the current signal $i_{OUT}$ to a voltage signal $V_{OUT}$ of sufficient magnitude to be applied as an input to a receiver module 16 for further signal processing, such as extracting the received message signal.

As mentioned above, a problem with conventional optical receivers is that the bandwidth of the receiver, as produced, may not match the requirements of a particular application. For example, an exemplary dense wavelength division multiplexed (DWDM) communication system may require an optical receiver with a bandwidth of 1.45 GHz. In accordance with the present invention, a digital controller 18 is coupled to pre-amplifier 14 and used to control a predetermined parameter (such as, for example, voltage, current, resistance, capacitance, etc.) so as to modify (either increase or decrease, as desired) the bandwidth of the device. A control signal, denoted C in FIG. 1, is applied as an input to digital controller 18 and used to provide the "increase"/"decrease" signal to digital controller 18.

Figure 2:
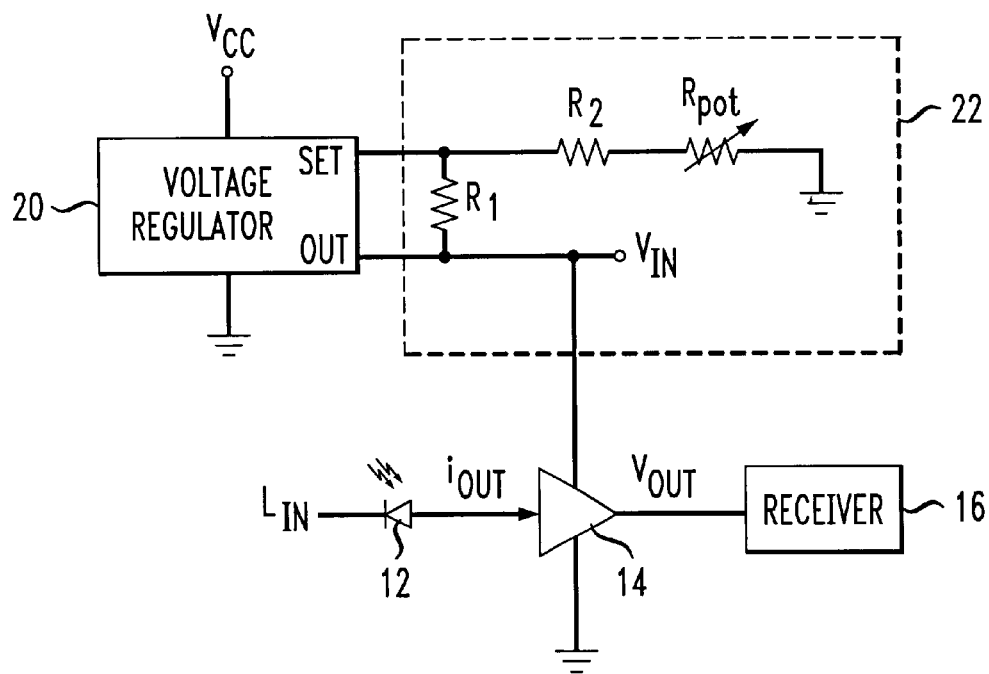
FIG. 2 is a simplified circuit diagram of an exemplary arrangement of the present invention utilizing a voltage regulator.

FIG. 2 illustrates a specific embodiment of the present invention utilizing a voltage regulator and adjustable resistor network in conjunction with the preamplifier to adjust the "as manufactured" bandwidth of an optical receiver so as to provide a receiver with the desired bandwidth. Referring to FIG. 2, an exemplary voltage regulator 20 is used to generate a voltage, denoted $V_{IN}$, that is applied as the bias input voltage to preamplifier 14. Voltage regulator 20 is coupled between the input supply potential, denoted $V_{CC}$, and ground, with an adjustable resistor network 22 coupled between a "set" input and the output of voltage regulator 20. Adjustable resistor network is shown as comprising a first resistor $R_1$ coupled between the "set" and "output" terminals of voltage regulator 20, a second resistor $R_2$ and an adjustable resistance $R_{POT}$, the combination of $R_2$ and $R_{POT}$ connected in series between the "set" input of voltage regulator 20 and ground.

Figure 3:
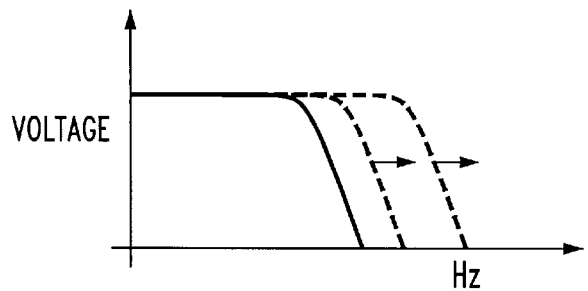
FIG. 3 is a graph illustrating the movement of an optical receiver bandwidth as a function of the implementation of the present invention from a bandwidth considered too "low" to a bandwidth in the acceptable range.
Figure 4:
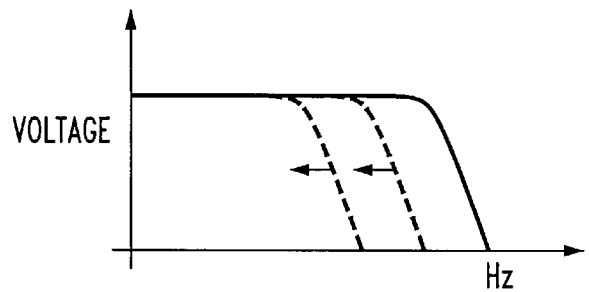
FIG. 4 is a graph illustrating the movement of an optical receiver bandwidth as a function of the implementation of the present invention from a bandwidth considered too "high" to a bandwidth in the acceptable range.

In operation of the present invention, receiver 10 is first evaluated to determine its bandwidth. If the value is within acceptable limits, no adjustments are required. For the purposes of the present discussion; it will first be presumed that the initial measured bandwidth is too "low", that is, the measured 3 dB cutoff frequency is below a lower limit acceptable for the particular receiver application. In the exemplary arrangement shown in FIG. 2, the value of $R_{POT}$ is decreased, which in turn increases the voltage, denoted $V_{IN}$, generated by voltage regulator 20. Preamplifier 14, which exhibits a bandwidth that is a function of applied input voltage, will therefore have an "increase" in its bandwidth as the applied voltage $V_{IN}$ increases. The bandwidth of receiver 10 can then be monitored, with the value of $R_{POT}$ continuously adjusted (in this case, decreased) until the bandwidth reaches an acceptable size. The value of $R_{POT}$ is then "fixed" at the value associated with the adjusted bandwidth. FIG. 3 contains a graph illustrating bandwidth adjustment in accordance with the present invention from a "low" bandwidth regime to an acceptable bandwidth, the adjustment resulting from a decrease in the value of $R_{POT}$ and applied as an input to preamplifier 14. Similarly, for the case where the initially measured bandwidth is too "high" for the particular receiver application, the value of $R_{POT}$ may be increased, thus decreasing the value of input voltage $V_{IN}$ applied to preamplifier 14 until the bandwidth of receiver 10 has decreased to an acceptable value. FIG. 4 contains a graph illustrating the movement of an exemplary receiver's bandwidth from a "high" bandwidth to an acceptable bandwidth range, resulting from an upward adjustment in the value of $R_{POT}$ until an acceptable value is obtained.

As mentioned above, an advantage of the arrangement of the present invention is that the voltage applied as an input to preamplifier 14 is a known, fixed value, controlled by voltage regulator 20. In conventional optical receiver arrangements, a preamplifier such as preamplifier 14 may use a supply line (such as $V_{CC}$) as the input voltage, where this voltage may vary from circuit to circuit (as well as over time). This variation in applied voltage thus results in an undesired variation in bandwidth in the prior art receiver arrangements. Therefore, the use of a voltage regulator to regulate the preamplifier supply voltage in accordance with the present invention ensures a consistent value of input voltage, regardless of any fluctuations in voltage appearing along the supply rails.

Figure 5:
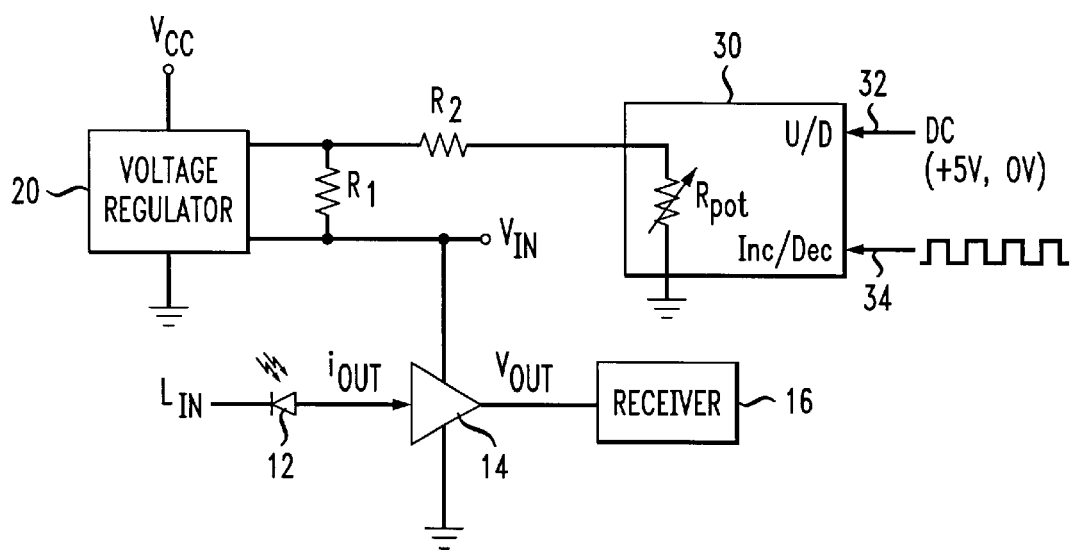
FIG. 5 contains an exemplary embodiment of the voltage control arrangement of the present invention including a digital potentiometer.

A preferred embodiment of the present invention, utilizing a digital potentiometer 30 and a positive power supply, is illustrated in FIG. 5. Digital potentiometer 30 is used to provide the adjustment (either increase or decrease) to $R_{POT}$ so as to adjust the size of the bandwidth of receiver 10 by controlling the voltage produced by voltage regulator 20. Referring to FIG. 5, digital potentiometer 30 includes a pair of inputs that are used to control the value of $R_{POT}$. A first DC input 32 is used to control the direction of the adjustment. For example, a positive value (such as 5V dc) applied to input 32 may be used to indicate that the value of $R_{POT}$ needs to be adjusted "upward". A negative value (or, alternatively, "ground" or 0V dc) applied to input 32 may then be used to indicate that the value of $R_{POT}$ needs to be adjusted "downward". Obviously, an alternative embodiment may use the complement of these values. Referring to FIG. 4, therefore, input 32 is denoted as the "UP/DOWN" input. Once the direction of the adjustment is ascertained, a series of pulses may then be applied to a second input 34, where each pulse will provide a predetermined level of increment (or decrement, as the case may be). For example, each pulse may result in adjusting the value of $R_{POT}$ such that the receiver bandwidth is moved by 30 MHz. A series of pulses thus results in changing (either increasing or decreasing) the receiver bandwidth in a series of 30 MHz steps, until an appropriate bandwidth is reached. It is to be understood that 30 MHz is only an exemplary value, related to the value of $R_{POT}$, and various other step sizes may be used in providing bandwidth adjustment in accordance with the present invention.

What is claimed is:

1. An optical receiver arrangement comprising
   an optoelectronic device for receiving an optical input signal and converting said optical input signal into an electrical current representation;
   a preamplifier coupled to the output of said optoelectronic device for amplifying the converted electrical current representation into an output voltage signal, said preamplifier coupled between one or more voltage supplies and ground potential, said preamplifier exhibiting a bandwidth that is a function of the value of said voltage supply;
   a digital controller coupled to the preamplifier and responsive to an externally supplied control signal, said digital controller for providing a digital bandwidth adjustment signal to said preamplifier, said digital bandwidth adjustment signal having a first value associated with increasing the preamplifier bandwidth and a second value associated with decreasing the preamplifier bandwidth; and an optical receiver for recovering a message signal from the output voltage generated by said preamplifier.

2. An optical receiver arrangement as defined in claim 1 wherein the digital controller comprises a voltage regulator for supplying the voltage supply to said preamplifier; and an adjustable resistor arrangement coupled to said voltage regulator for modifying said voltage supply generated by said voltage regulator so as to adjust the bandwidth of said preamplifier.

3. An optical receiver as defined in claim 2 wherein the adjustable resistor arrangement comprises a first known resistor and a potentiometer coupled so that the ratio of said first known resistor to said potentiometer is adjusted to adjust the supply voltage generated by said voltage regulator.

4. An optical receiver as defined in claim 3 wherein a positive voltage supply is provided and an increase in the value of the potentiometer results in increasing the supply voltage applied to the preamplifier, thus increasing the bandwidth exhibited by said preamplifier.

5. An optical receiver as defined in claim 3 wherein a positive voltage supply is provided and a decrease in the value of the potentiometer results in decreasing the supply voltage applied to the preamplifier, thus decreasing the bandwidth exhibited by said preamplifier.

6. An optical receiver as defined in claim 3 wherein a negative voltage supply is provided and a decrease in the value of the potentiometer results in decreasing the supply voltage applied to the preamplifier, thus increasing the bandwidth exhibited by said preamplifier.

7. An optical receiver as defined in claim 3 wherein a negative voltage supply is provided and an increase in the value of the potentiometer results in increasing the supply voltage applied to the preamplifier, thus decreasing the bandwidth exhibited by said preamplifier.

8. An optical receiver as defined in claim 3 wherein the potentiometer comprises a digital potentiometer.

9. An optical receiver as defined in claim 8 wherein the digital potentiometer comprises a pair of inputs, a first input of said pair of inputs used to indicate the increment/decrement status of the potentiometer adjustment and a second, remaining input of said pair of inputs to used to provide a series of adjustments to the potentiometer value so as to result in a series of frequency adjustments of a predetermined interval to the bandwidth of the preamplifier.

10. An optical receiver as defined in claim 8 wherein the first input to said digital potentiometer comprises a DC signal used to indicate the increment/decrement status.

11. An optical receiver as defined in claim 10 wherein a positive DC signal is used to indicate the need to increment the value of the potentiometer and a ground signal is used to indicated the need to decrement the value of said potentiometer.

12. An optical receiver as defined in claim 9 wherein the second input to said digital potentiometer comprises a series of pulses, each pulse providing an adjustment to the value of the potentiometer of a predetermined value, resulting in an adjustment of the preamplifier bandwidth of a predetermined value.

13. An optical receiver as defined in claim 12 wherein each pulse provides an adjustment of approximately 30 MHz to the preamplifier bandwidth.

14. A method of adjusting the bandwidth of an optical receiver to achieve a predetermined bandwidth, the optical receiver including a preamplifier with a bandwidth that is a function of a supply voltage applied thereto, the method comprising the steps of:

a) measuring an initial bandwidth of the optical receiver;

b) comparing the measured value to the predetermined value; and c) modifying the preamplifier supply voltage in a first direction when the measured bandwidth is less than the predetermined value and in a second, opposite direction when the measured bandwidth is greater than the predetermined value.

15. The method according to claim 14 wherein in performing step c) an adjustable resistance is coupled as an input to a voltage regulator and the resistance value is adjusted to increase and decrease the supply voltage applied to the preamplifier.

16. The method according to claim 15 wherein in performing step c) a digital potentiometer is used as the adjustable resistance.

17. The method according to claim 16 wherein the digital potentiometer is responsive to a first, DC signal indicative of whether to adjust in the first or second direction and also responsive to a second, pulsed signal for adjusting the resistance value in predetermined step sizes until the measured bandwidth is essentially equal to the desired bandwidth.

* * * * *